United States Patent
Wells

(10) Patent No.: US 9,460,625 B2
(45) Date of Patent: Oct. 4, 2016

(54) PROXY DSRC BASIC SAFETY MESSAGE FOR UNEQUIPPED VEHICLES

(71) Applicants: DENSO International America, Inc., Southfield, MI (US); DENSO CORPORATION, Kariya-shi, Aichi-ken (JP)

(72) Inventor: Bryan Wells, Oceanside, CA (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 30 days.

(21) Appl. No.: 14/247,352

(22) Filed: Apr. 8, 2014

(65) Prior Publication Data
US 2015/0287323 A1    Oct. 8, 2015

(51) Int. Cl.
| G08G 1/16 | (2006.01) |
| G08G 1/04 | (2006.01) |
| G08G 1/01 | (2006.01) |
| G01S 13/93 | (2006.01) |
| G01S 15/93 | (2006.01) |
| G01S 13/86 | (2006.01) |

(52) U.S. Cl.
CPC ............ *G08G 1/163* (2013.01); *G01S 13/862* (2013.01); *G01S 13/867* (2013.01); *G01S 13/931* (2013.01); *G01S 15/931* (2013.01); *G08G 1/04* (2013.01); *G08G 1/161* (2013.01); *B60R 2300/80* (2013.01); *G01S 2013/936* (2013.01); *G01S 2013/9325* (2013.01); *G01S 2013/9357* (2013.01); *G08G 1/0112* (2013.01)

(58) Field of Classification Search
CPC .... G08G 1/1666; G08G 1/163; G08G 1/161; G08G 1/04; G08G 1/0112; G01S 1/00; G01S 13/931; G01S 2013/936; G01S 2013/9625; H04H 20/71; H04N 7/18; G07C 5/008
See application file for complete search history.

(56) References Cited

U.S. PATENT DOCUMENTS

| 5,467,072 | A * | 11/1995 | Michael | G01S 13/931 340/436 |
| 7,994,902 | B2 * | 8/2011 | Avery | G08G 1/161 701/301 |
| 8,340,894 | B2 * | 12/2012 | Yester | G08G 1/163 701/301 |
| 8,742,987 | B2 * | 6/2014 | Bai | G08G 1/163 342/454 |
| 9,129,532 | B2 * | 9/2015 | Rubin | G08G 1/162 |
| 2004/0267452 | A1 * | 12/2004 | Igarashi et al. | 701/300 |
| 2007/0096885 | A1 * | 5/2007 | Cheng | G08G 1/163 340/435 |
| 2009/0309757 | A1 * | 12/2009 | Mudalige | G08G 1/161 340/905 |
| 2011/0087433 | A1 * | 4/2011 | Yester | G08G 1/163 701/301 |
| 2011/0128902 | A1 * | 6/2011 | Guo | 370/312 |
| 2011/0140968 | A1 * | 6/2011 | Bai | G08G 1/163 701/300 |
| 2012/0105625 | A1 * | 5/2012 | Richardson et al. | 348/135 |

(Continued)

*Primary Examiner* — Dale W Hilgendorf
(74) *Attorney, Agent, or Firm* — Harness, Dickey & Pierce, P.L.C.

(57) ABSTRACT

A method for generating a message including vehicle operating parameters. The method includes the following: measuring operating parameters of an unequipped vehicle using monitoring equipment present on an equipped vehicle that is proximate to the unequipped vehicle; generating at the equipped vehicle a message including the measured operating parameters of the unequipped vehicle; and transmitting from the equipped vehicle to surrounding vehicles the message including the measured operating parameters of the unequipped vehicle to inform surrounding vehicles of the operating parameters of the unequipped vehicle.

15 Claims, 1 Drawing Sheet

(56) References Cited

U.S. PATENT DOCUMENTS

2013/0030688 A1* 1/2013 Shimizu .................. G08G 1/161 701/301

2013/0151088 A1* 6/2013 Ricci .................... G08G 1/0141 701/118

2013/0279491 A1* 10/2013 Rubin .................... G08G 1/163 370/347

* cited by examiner

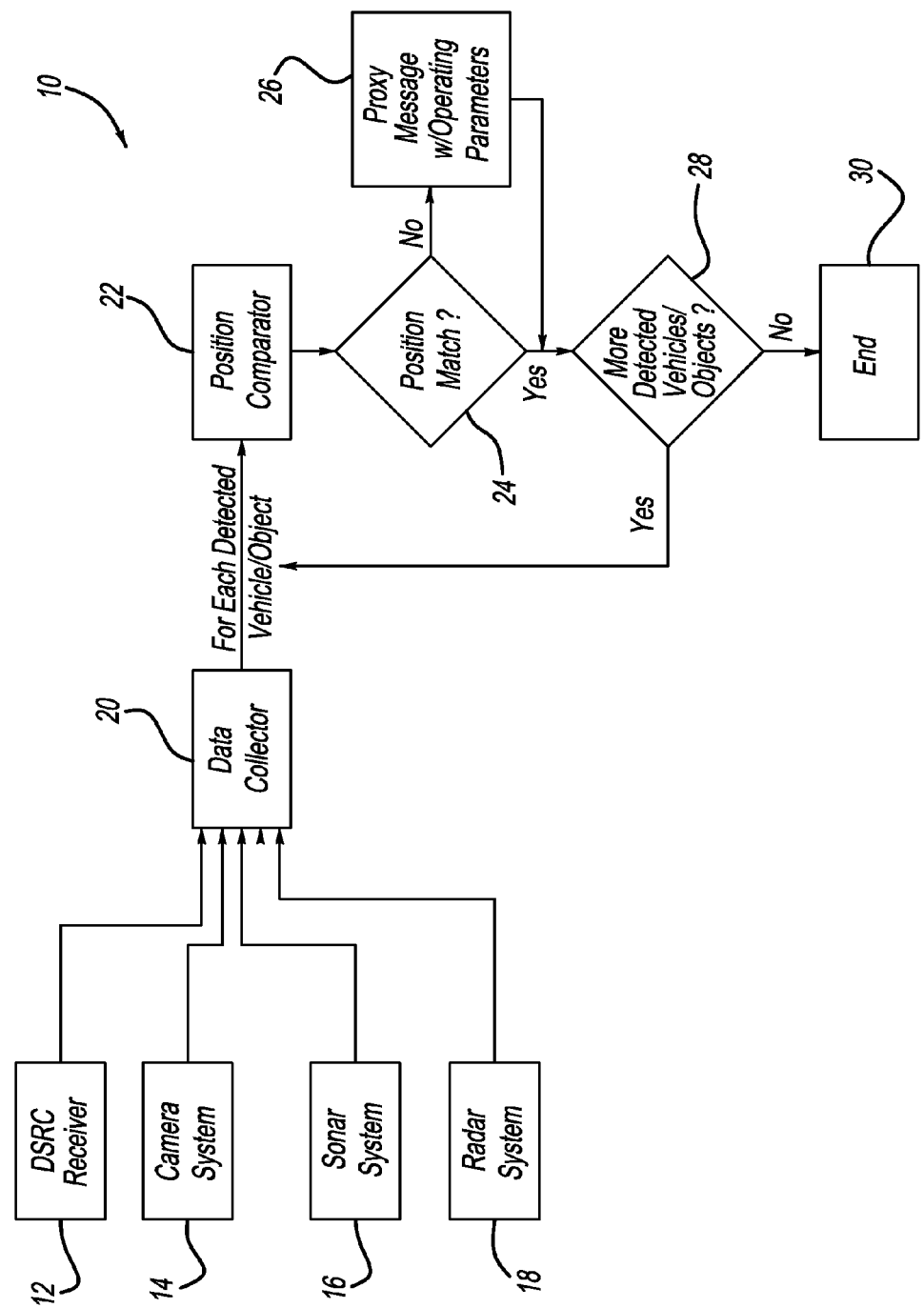

PROXY DSRC BASIC SAFETY MESSAGE FOR UNEQUIPPED VEHICLES

FIELD

The present disclosure relates to generating a proxy DSRC basic safety message for unequipped vehicles.

BACKGROUND

This section provides background information related to the present disclosure, which is not necessarily prior art.

Active safety systems based on vehicle-to-vehicle and vehicle-to-infrastructure wireless communications, such as dedicated short range communication (DSRC), identify potential threats and hazards on a roadway and provide drivers with associated alerts and warnings. To maximize the benefits of such active safety systems, wireless communication equipment would have to be installed in all vehicles and relevant pieces of infrastructure, which will take many years to achieve, and may never be fully achieved. An alternative active safety system in which less than all vehicles and pieces of infrastructure are equipped with DSRC would therefore be desirable.

SUMMARY

This section provides a general summary of the disclosure, and is not a comprehensive disclosure of its full scope or all of its features.

The present teachings include a method for generating a message including vehicle operating parameters. The method includes the following: measuring operating parameters of an unequipped vehicle using monitoring equipment present on an equipped vehicle that is proximate to the unequipped vehicle; generating at the equipped vehicle a message including the measured operating parameters of the unequipped vehicle; and transmitting from the equipped vehicle to surrounding vehicles the message including the measured operating parameters of the unequipped vehicle to inform surrounding vehicles of the operating parameters of the unequipped vehicle.

The present teachings further include a method for generating one or more proxy messages including vehicle operating parameters. The method includes receiving at a primary equipped vehicle messages from secondary equipped vehicles, the messages identifying positions of each one of the secondary equipped vehicles; comparing the positions of the secondary equipped vehicles with positions of unequipped vehicles detected by the primary equipped vehicle for which no messages have been received; generating at the primary equipped vehicle a proxy message for each one of the unequipped vehicles including operating parameters of the unequipped vehicles; and transmitting from the primary equipped vehicle to the secondary equipped vehicles the proxy messages generated for each one of the unequipped vehicles to inform the secondary equipped vehicles of the operating parameters of the unequipped vehicles.

The present teachings also include a method for generating at least one proxy basic safety message (PBSM) having vehicle operating parameters. The method includes the following: identifying locations of secondary vehicles proximate to a primary vehicle using identification equipment of the primary vehicle; comparing positions of the secondary vehicles identified by the primary vehicle to vehicle positions set forth in basic safety messages (BSMs) received by the primary vehicle; designating as secondary equipped vehicles the secondary vehicles identified by the primary vehicle having positions that match the vehicle positions set forth in the BSMs received by the primary vehicle; designation as secondary unequipped vehicles the secondary vehicles identified by the primary vehicle having positions that do not match the vehicle positions set forth in the BSMs received by the primary vehicle; generating at the primary vehicle the PBSM for each one of the secondary unequipped vehicles including operating parameters of the unequipped vehicles; and transmitting from the primary vehicle to the secondary equipped vehicles the PBSMs to inform the secondary equipped vehicles of the operating parameters of the secondary unequipped vehicles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates a method and system according to the present teachings for generating one or more messages including vehicle operating parameters according to the present teachings for vehicles not equipped with an active safety system.

Corresponding reference numerals indicate corresponding parts throughout the several views of the drawings.

DETAILED DESCRIPTION

Example embodiments will now be described more fully with reference to the accompanying drawings.

With reference to FIG. 1, a method and system according to the present teachings for generating a proxy message including vehicle operating parameters for a vehicle not equipped with an active safety system, such as dedicated short range communication (DSRC), is generally illustrated at reference numeral 10. A DSRC receiver of a DSRC equipped vehicle is illustrated at reference numeral 12. The DSRC receiver 12 is configured to receive DSRC basic safety messages (BSM) from DSRC equipped vehicles proximate to the primary DSRC equipped vehicle. The BSMs can include information regarding any suitable operating parameter of the surrounding DSRC equipped vehicles, such as one or more of the following operating parameters of each one of the DSRC equipped vehicles for example: GPS position data; acceleration; speed; change in speed; throttle percentage; steering angle; and any other suitable operating parameter.

The primary DSRC equipped vehicle further includes any suitable equipment for detecting the positions of vehicles or objects proximate to the primary DSRC equipped vehicle. For example, the primary DSRC equipped vehicle may include a camera system 14, a sonar system 16, a radar system 18, or any other suitable vehicle or object detecting device.

Data from the DSRC receiver 12, the camera system 14, the sonar system 16, the radar system 18, and any other suitable device for detecting vehicles and/or objects proximate to the primary DSRC equipped vehicle is input to a data collector 20. The data collector 20 can be any suitable processing device, such as a central processing unit (CPU). The data collected for each vehicle and/or object by the data collector 20 is input to a position comparator 22. The position comparator 22 may be any suitable device configured to compare data collected by the data collector 20, such as a CPU. The position comparator 22 may be separate from the data collector 20 or included with the data collector 20. For example, the CPU of the position comparator 22 may be separate from, or the same as, the CPU of the data collector 20.

The position comparator 22 compares the position of a secondary DSRC equipped vehicle, based on the BSM location information (for example) transmitted to the DSRC receiver 12 of the primary DSRC equipped vehicle, with vehicles and/or objects detected by the primary DSRC equipped vehicle using the primary vehicle's on board detection systems or devices, such as the camera system 14, the sonar system 16, and/or the radar system 18. If the position comparator 22 identifies a match at block 24, and if at block 28 additional BSM data is available for comparison, then the position comparator 22 again determines whether a position match exists at block 24. If at block 24 the position comparator 22 determines that the primary DSRC equipped vehicle detected a vehicle or object for which no BSM data has been received, then at block 26 the primary equipped vehicle generates a proxy BSM for the vehicle not equipped with DSRC (unequipped vehicle). A proxy BSM for an object can be generated as well.

The proxy BSM message includes any suitable vehicle operating parameter information, such as GPS position data, speed, change in speed, acceleration, etc. The vehicle operating parameter information is measured relative to the position of the primary DSRC equipped vehicle because the parameters are measured by the equipped vehicle, such as by using one or more of the camera system 14, the sonar system 16, and the radar system 18. The proxy message is transmitted by the primary equipped vehicle to surrounding secondary DSRC equipped vehicles, such as the vehicles for which the primary vehicle received BSMs for at the DSRC receiver 12. In this manner, all DSRC equipped vehicles in the vicinity of the unequipped vehicles will be aware of the position and operating parameters of the unequipped vehicle or vehicles, and thus be able to avoid the unequipped vehicles and continuously monitor their location or any other suitable parameter. Proxy BSMs can also be generated for objects, and can include any suitable information for the objects, such as location and type for example. If no additional vehicles or objects are detected by the primary equipped vehicle at block 28, the operation ends at block 30.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for generating a message including vehicle operating parameters comprising:
   measuring operating parameters of an unequipped vehicle relative to an equipped vehicle that is proximate to the unequipped vehicle using monitoring equipment present on the equipped vehicle while the unequipped vehicle and the equipped vehicle are both in motion;
   detecting a position of the unequipped vehicle by a detection device of the equipped vehicle;
   generating at the equipped vehicle a message including the measured operating parameters of the unequipped vehicle; and
   transmitting from the equipped vehicle to surrounding vehicles the message including the measured operating parameters of the unequipped vehicle to inform surrounding vehicles of the operating parameters of the unequipped vehicle;
   wherein:
      the message is a basic safety message (BSM);
      the equipped vehicle and the surrounding vehicles are equipped with dedicated short range communications (DSRC) operable to send and receive BSMs;
      the unequipped vehicle is not equipped with functioning DSRC; and
      the equipped vehicle compares, with a comparator of the equipped vehicle, position of the unequipped vehicle as detected by the equipped vehicle with positions set forth in BSMs received by the equipped vehicle, whereby the equipped vehicle determines the unequipped vehicle to be unequipped with functioning DSRC if position of the unequipped vehicle as determined by the equipped vehicle does not match any vehicle position set forth in the BSMs received by the equipped vehicle.

2. The method of claim 1, further comprising measuring at least one of the following operating parameters of the unequipped vehicle relative to the equipped vehicle: location; acceleration; change in speed; speed increase; speed decrease; directional heading; or change in directional heading.

3. The method of claim 1, further comprising measuring operating parameters of the unequipped vehicle using at least one of radar and sonar present on the equipped vehicle.

4. The method of claim 1, further comprising measuring operating parameters of the unequipped vehicle using 360° radar present on the equipped vehicle.

5. The method of claim 1, further comprising measuring operating parameters of the unequipped vehicle using a camera present on the equipped vehicle.

6. The method of claim 1, further comprising transmitting from the equipped vehicle the measured operating parameters of the unequipped vehicle using dedicated short range communications (DSRC).

7. The method of claim 1, further comprising transmitting from the equipped vehicle the measured operating parameters of the unequipped vehicle as the basic safety message (BSM) using dedicated short range communications (DSRC).

8. The method of claim 1, further comprising transmitting from the equipped vehicle the basic safety message including vehicle operating parameters of the equipped vehicle including at least one of the following: GPS coordinates; speed; or acceleration.

9. A method for generating one or more proxy messages including vehicle operating parameters comprising:
   receiving at a primary equipped vehicle messages from secondary equipped vehicles, the messages identifying positions of each one of the secondary equipped vehicles;
   detecting positions of unequipped vehicles using a detection device of the primary equipped vehicle;
   measuring operating parameters of the unequipped vehicles using detection equipment of the primary equipped vehicle;
   using a position comparator to compare the identified positions of the secondary equipped vehicles with positions of unequipped vehicles detected by the primary equipped vehicle for which no messages have been received;
   generating at the primary equipped vehicle a proxy message for each one of the unequipped vehicles including operating parameters of the unequipped vehicles;
   transmitting from the primary equipped vehicle to the secondary equipped vehicles the proxy messages generated for each one of the unequipped vehicles to inform the secondary equipped vehicles of the operating parameters and positions of the unequipped vehicles;
   receiving at the primary equipped vehicle the messages from the secondary equipped vehicles in the form of basic safety messages (BSMs);
   transmitting from the primary equipped vehicle to the secondary equipped vehicles the proxy messages in the form of BSMs; and
   transmitting the BSMs using dedicated short range communications (DSRC).

10. The method of claim 9, further comprising measuring the operating parameters of each one of the unequipped vehicles relative to the primary equipped vehicle.

11. The method of claim 9, further comprising measuring at least one of the following operating parameters of the unequipped vehicles relative to the equipped vehicle: location; acceleration; change in speed; speed increase; speed decrease; directional heading; or change in directional heading.

12. The method of claim 9, further comprising measuring operating parameters of the unequipped vehicles using monitoring equipment present on the equipped vehicle including at least one of radar and sonar.

13. A method for generating at least one proxy basic safety message (PBSM) including vehicle operating parameters comprising:
   identifying locations of secondary vehicles proximate to a primary vehicle using a detecting device of the primary vehicle;
   using a position comparator to compare positions of the secondary vehicles identified by the primary vehicle to vehicle positions set forth in basic safety messages (BSMs) received by the primary vehicle;
   designating as secondary equipped vehicles the secondary vehicles identified by the primary vehicle having detected positions that match the vehicle positions set forth in the BSMs received by the primary vehicle;
   designating as secondary unequipped vehicles the secondary vehicles identified by the primary vehicle having detected positions that do not match the vehicle positions set forth in the BSMs received by the primary vehicle;
   measuring operating parameters of the secondary unequipped vehicles using detection equipment of the primary equipped vehicle;

generating at the primary vehicle the PBSM for each one of the secondary unequipped vehicles including operating parameters of the secondary unequipped vehicles;

transmitting from the primary vehicle to the secondary equipped vehicles the PBSMs to inform the secondary equipped vehicles of the operating parameters and positions of the secondary unequipped vehicles; and transmitting the BSMs and PBSMs using dedicated short range communications (DSRC).

14. The method of claim 13, further comprising identifying locations of the secondary vehicles proximate to the primary vehicle using at least one of radar and sonar.

15. The method of claim 13, wherein the vehicle operating parameters include at least one of the following: location; acceleration; change in speed; speed increase; speed decrease; directional heading; or change in directional heading.

* * * * *